United States Patent [19]
Vieth et al.

[11] 4,426,427
[45] Jan. 17, 1984

[54] SATURATED PREFORM AND METHOD FOR PREPARATION THEREOF

[76] Inventors: Wolf R. Vieth, 19 Partridge Run, Belle Meade, N.J. 08502; Leonard B. Ryder, 5 Sharon Dr., Whippany, N.J. 07981

[21] Appl. No.: 505,886

[22] Filed: Jun. 20, 1983

Related U.S. Application Data

[62] Division of Ser. No. 399,824, Jul. 19, 1982.

[51] Int. Cl.³ .............................................. B32B 9/04
[52] U.S. Cl. ................................. 428/542.8; 264/50; 428/35
[58] Field of Search .................... 428/542.8; 215/1 C; 264/50, DIG. 1

[56] References Cited
U.S. PATENT DOCUMENTS 3,144,493  8/1964  Santelli ..................... 264/DIG. 1
3,225,127  12/1965  Scott, Jr. .................. 264/DIG. 1

FOREIGN PATENT DOCUMENTS 54-23671  2/1979  Japan ............................ 265/50

*Primary Examiner*—Marion McCamish
*Assistant Examiner*—Beverly K. Johnson
*Attorney, Agent, or Firm*—Edward M. Fink

[57] ABSTRACT

Presaturated plastic preforms suitable for use in preparing molecularly oriented hollow articles from thermoplastic materials are obtained by adding controlled amounts of a saturant gas, under pressure, into a molten polymer stream residing in the screw channels of a screw plasticizer in a preform injection molding machine. The polymer so treated is then injected into cooled preform molds to obtain the desired article.

6 Claims, No Drawings

SATURATED PREFORM AND METHOD FOR PREPARATION THEREOF

This is a division of application Ser. No. 399,824, filed on July 19, 1982.

This invention relates to presaturated plastic preforms. More particularly, the present invention relates to a technique for the preparation of presaturated plastic preforms suitable for use in preparing molecularly oriented hollow articles from thermoplastic materials, and to the preforms so produced.

Biaxially oriented plastic containers are rapidly assuming a dominant role in the packaging industry, particularly for food and beverages. Evidence of this phenominal growth is especially apparent in the carbonated soft drink field wherein more than two billion 2-liter biaxially oriented polyethylene terephthalate ("PET") bottles were used for packaging purposes in 1981 in the United States. Additionally, it is common practice to package carbonated soft drinks in ½, 1 and 1½ liter bottles of the type described.

The vast majority of the biaxially oriented PET bottles produced for such purposes are prepared by means of a conventional two step reheat-blow technique wherein a different apparatus is employed in each step. In a typical process of this type, the first step involves molding PET preforms in an injection molding machine, cooling the preform so prepared and removing it from the injection molding machine. The preform then serves as the feedstock in a second processing step wherein a reheat-blow machine is employed. In this step, the preform is reheated to a temperature of about 190°–200° F., the PET orientation temperature, and, subsequently, stretch blow molded into biaxially oriented bottles within cooled bottle blow molds which are mounted in the reheat-blow machine. Accordingly, the plastic preform of interest herein is the intermediate product in the process of converting thermoplastic polyethylene terephthalate molding pellets into a molecularly biaxially oriented PET hollow article suitable for use as a bottle or container.

A substantial number of biaxially oriented PET carbonated soft drink bottles are also manufactured by the well-known in-line stretch-blow molding technique wherein the biaxially oriented container is formed in one apparatus having a plurality of positions or stations.

The major cost element in the manufacture of the PET soft drink bottle is the cost of the PET resin itself. Accordingly, PET bottle suppliers have focused their interest upon limiting the PET resin in the bottle by maximizing the level and uniformity of orientation and by minimizing wall-thickness, without adversely affecting carbonation retention and strength properties. As a result of such efforts, the major parent carbonated soft drink manufacturers in the United States have established a shelf life specification requirement such that PET bottles must provide sufficient carbon dioxide barrier properties so that when used to package carbonated soft drinks at least 85% of the original carbonation level will be retained after storage at room temperature for 16 weeks. As defined by the industry, the term shelf life for a carbonated beverage bottle is the time, in weeks, for the beverage to lose 15% of its original carbonation level.

Heretofore, the PET bottle producers have had little difficulty in furnishing 2-liter bottles which meet the 16 week shelf life requirement at attractive container weights and prices. However, they have encountered considerable difficulty in producing economically viable half liter PET bottles which meet the shelf life requirement.

The vast majority of half liter PET carbonated beverage bottles presently being produced in the United States contain from 29–32 grams of PET resin, although certain 2 piece generic bottles have PET resin contents ranging from 26–27 grams. Unfortunately, the wall thicknesses of bottles in this weight range are too thin to afford sufficient carbonation retention to achieve the desired 16 week shelf life requirement. Experience has shown that shelf life of such bottles typically ranges from 10–14 weeks, a period which is not deemed adequate for storage and distribution in slow moving market areas.

Immediately after filling and applying the closure, carbon dioxide begins to escape from beverage packaged in half-liter PET bottles in four ways: (1) the bottle will expand slowly (creep) under internal pressure, usually around 5 atmospheres (absolute) for most carbonated soft drinks, to create a larger headspace into which carbon dioxide will escape from the beverage. The total carbon dioxide in the headspace is considered to be a loss from the beverage, (2) carbon dioxide is soluble in PET, so there will be a loss of carbonation due to sorption of a certain amount of carbon dioxide into the PET resin in the bottle, the amount of which depends upon the amount of PET resin in the bottle and the average pressure and temperature conditions, (3) closure loss due to leakage through the closure seal, and, finally, (4) permeation loss due to the passage of carbon dioxide through the walls of the bottle. The thinner the bottle, the higher the permeation loss. On the other hand, the heavier the bottle the higher the sorption loss. Studies have shown, in the case of 24 gram half-liter PET bottles that, of the allowable carbonation loss, closure leakage accounts for about 3% of the total, "creep" for about 15%, sorption for about 24%, and permeation for about 58%.

PET bottle producers, recognizing that permeation accounts for most of the carbonation loss in half-liter bottles, are starting to employ bottles coated with very thin layers of high gas barrier resins, as a means of extending shelf life in light weight bottles. Such coating resins include high barrier polyvinylidene chloride (PVDC) copolymer latices, which have carbon dioxide permeabilities which are 150-fold lower than that of oriented PET. Thus, for example, one manufacturer of PVDC copolymers has developed a mathematical model which predicts that an uncoated 24 gram half liter PET bottle would have a shelf life of 8½ weeks which may conveniently be extended to 14½ weeks or 29 weeks by application of an external 0.1 mil. or 0.4 mil. coating of high barrier Saran respectively. The application of such a coating has been found to reduce the loss of carbonation due to permeation, thereby extending shelf life, despite the fact that that portion of the loss which is attributed to sorption increases with increased coating thickness, due to the higher gas pressure drop which occurs across the barrier coating. Accordingly, all of the PET will have a higher internal pressure of carbon dioxide when coated, as compared with the uncoated structure, and, consequently, a higher level of sorption. However, the marked decrease in the rate of permeation loss afforded by the coating, more than offsets the increase in sorption loss, to a degree which results in a substantial shelf life extension.

For example, in the case cited above of a 24 gram half-liter PET bottle externally coated with a 0.4 mil. coating of Saran, studies have shown that, although the carbon dioxide loss due to sorption increases about 1½-fold due to the coating, the rate of permeation decreases more than 5-fold, with the net result that shelf life is extended more than 3-fold, from about 8½ weeks to 29 weeks.

Although the weight reduction and shelf life extension attainable with such coatings appear attractive, the application of the coating adds complexity to the manufacturing process, as well as the recycling sequence. Accordingly, there is a need in the art for a practical technique for increasing the shelf life of biaxially oriented, shaped, thermoplastic articles such as the oriented PET carbonated soft drink bottles. In particular, there is a great need for uncoated bottles having minimal weights and wall thicknesses, which are sufficient to provide the strength necessary to withstand the rigors of use and handling, while at the same time possessing sufficient barrier and other characteristics to provide the desired shelf life.

In accordance with the present invention, the aforementioned prior art deficiencies are successfully obviated by a novel technique which permits the preparation of a presaturated thermoplastic preform which may be stretch blow molded into a biaxially oriented hollow article having walls which are saturated with a presaturant gas capable of extending the shelf life of the product packaged therein while safeguarding it against oxygen attack. The inventive technique involves adding controlled amounts of a saturant gas, under pressure, into a molten polymer stream residing in the screw channels of a screw type plasticizer employed in a preform injection molding machine, as the polymer melt is conveyed through the screw plasticizer and subsequently injected into cooled preform molds. The level of shelf life extension attainable by the use of the resultant presaturated preforms described herein is dependent upon the level to which the preform is saturated prior to stretch blow molding into the final shape. Thus, for example, if the preform is presaturated with carbon dioxide prior to being stretch-blow molded into a bottle, to a level equivalent to the amount which would normally be absorbed into the bottle walls after filling and capping, no sorption loss will occur when such a preform, since the PET bottle walls had already been presaturated with carbon dioxide prior to contacting the beverage. Under these circumstances, the carbon dioxide which would have otherwise been lost from the beverage due to sorption, will now only be lost through closure leakage and premeation through the walls of the bottle.

Studies have revealed (in the case of 24 gram half-liter PET beverage bottles) that elimination of the carbon dioxide loss due to sorption, in and of itself, will result in a shelf life extension of 3½ weeks, which corresponds to the additional time it would take for that amount of carbon dioxide to escape from the bottle by permeation and closure leakage. In the case under study, shelf life of the presaturated bottle was calculated to be 12 weeks, or 3½ weeks longer than the 8½ weeks predicted for a non-presaturated bottle, so representing a shelf-life increase of about 41%

In the event the preform is presaturated to a level exceeding that corresponding to the equilibrium saturation level of carbon dioxide in the walls of the bottle at the equilibrium temperature and pressure conditions which prevail after storage of the beverage within the bottle, greater shelf-life extension can be achieved. In other words, supersaturation of the walls of the bottle with carbon dioxide prior to filling with a carbonated beverage yields a product shelf life greater than that obtainable with saturation of the walls. Shelf life under these circumstances will be dependent upon the level of supersaturation. It is theorized that the increment in shelf life occasioned by supersaturation may be attributed to the fact that approximately one-half of the supersaturation level of carbon dioxide in the walls of the bottle will initially migrate into the bottle interior, so increasing the carbon dioxide content within the bottle interior. At a later time during storage, the portion of carbon dioxide migrating into the bottle interior will escape to the outside ambient through closure leakage and permeation, along with other carbon dioxide present. The balance of the supersaturated portion of carbon dioxide in the walls of the supersaturated bottle which does not migrate into the bottle will escape outward from the bottle walls by permeation. This inward and outward migration of the supersaturated portion of carbon dioxide in the walls of the bottle continues until the carbon dioxide content in the walls decreases to a carbon dioxide saturation level corresponding with the equilibrium solubility content of carbon dioxide in PET under the average conditions at which the beverage is stored, for example, 72° F. and 4.71 atmospheres.

In light of the foregoing, it is apparent that the preparation of attractively priced oriented PET carbonated beverage bottles having walls presaturated with a gas constitutes a novel technology in the packaging field.

Thermoplastic materials suitable for use in the practice of the present invention include polyethylene terephthalate (PET), PET copolymers, nitriles, polyvinyl chloride, and those thermoplastics normally in a glassy state under conditions described herein.

The saturant gases compatible with the described process and thermoplastics contemplated for use herein include carbon dioxide, dichlorodifluoro methane, and oxygen. These saturant gases dissolve in and occupy sites within the polymeric material which are otherwise accessible to migrating components of beverages, saturation being attained when all sites are occupied. This presaturation of sites within the walls of the plastic container eliminates product component losses which would normally occur due to saturation or absorption in container walls.

As indicated above, the inventive technique involves adding a saturant gas to a molten polymer stream in the screw channels of a screw type plasticizer in a preform injection molding machine. Screw plasticizers suitable for injection molding PET preforms for subsequent stretch blow molding are of the reciprocating type and normally include single stage screws. Unfortunately, the single stage screws currently employed in PET preform injection molding machines are not well suited to the preparation of presaturated PET preforms, due to difficulties encountered in the effort to add controlled and uniform amounts of saturant gas into the pressurized melt stream being conveyed through the screw channels of the plasticizer.

The technique described herein contemplates the use of a two stage screw plasticizer which permits effective addition and dissolution of pressurized saturant gas in a melt stream passing through a plasticizer. The two stage screws contemplated for this purpose include a first stage which functions as the primary plasticizer in which solid polymer being fed from the hopper is picked up, melted, pressurized, conveyed and metered forward to the feed section of the second stage. The channel depth of the feed section of this second stage screw is much deeper than that of the upstream metering section of the first stage screw, typically three times deeper. Accordingly, its conveying capacity is much higher and the section will be starve fed by the upstream metering section, the screw channels being only partially filled with molten polymer. Thus, pressurized saturant gas may be added to the molten polymer stream passing through this section by providing a flow path through the barrel of the plasticizer along its length which registers with the location of the second stage screw feed section, preferably in the middle of the section to prevent misregistration when the screw reciprocates. In order to prevent the pressurized gas from leaking backward through the melt in the screw channels of the upstream metering section, a flow restriction ring is added to the forward end of the first metering section and serves as a dam over which forward moving molten polymer must pass to continue its forward motion. A considerable amount of pressure builds up in the melt before it passes over the top face of the flow restriction ring, which pressure is significantly higher than the pressure required to pump saturant gas into the second feed zone of the screw. Accordingly, the molten polymer passing over the flow restriction ring will act as a liquid seal and prevent any pressurized saturant gas from leaking backward through the screw. As the molten polymer is conveyed forward in the second stage screw, the pressurized saturant gas intimately mixes with and dissolves into the molten polymer. As the molten polymer is pumped through the transition and metering sections of the second stage screw, it is repressurized. Following, the now saturated molten polymer passes through a mixing head section of the second stage screw, for final homogenization before being accumulated for an injection shot.

The pre-saturated PET preforms contemplated herein may be prepared by the injection molding techniques described by prior art workers, with the sole exception that a saturant gas is added to the polymer melt stream, and a two stage screw is substituted for the single stage screw employed by the prior art.

In the operation of the process, it is important to have a uniform quantity of saturant gas dissolved in molten polymer leaving the plasticizer. For this purpose, a flow control means is provided in the inlet saturant gas feed line to the plasticizer, which synchronizes and matches the addition of the saturant gas to the forward flow of the molten polymer passing through the plasticizer. This is of particular importance in the screw reciprocation portion of the cycle.

The two stage screws employed in the practice of the present invention may have length to diameter ratios ranging from 24:1 to 28:1, such being required to facilitate the intervention and solutioning of saturant gas in the molten PET stream passing through the plasticizer.

Suitable screw profiles for the two stage screws used to prepare presaturated PET preforms might include the following configurations:

A. 24:1 length-to-diameter screw:
1. Section lengths of 4 turns in the feed, transition, and metering sections of the first stage screw.
2. A flow restriction ring section having a length equivalent to about ½ screw turn with a ring face width of about 1 inch.
3. Upstream and downstream taper sections leading to and from the restriction ring face.
4. Second stage screw with feed section length of 2 turns, transition section length of 4 turns, metering section length of 4 turns and mixing section length of 1½ turns.
5. Compression ratios in first and second stage screws of 3:1 and 2:1, respectively.
6. Channel depths employed in the screw flights in the different screw sections are dependent upon the molecular weight and viscosity of the particular polymer being processed, the production rate desired, cycle time, desired melt temperature and pressure, and the desired level of melt saturation The screw configuration and channel depth profiles should be chosen such that molten PET is furnished for shot accumulation at a melt temperature of about 540°–550° F., with a melt pressure of at least 1000 psi. The speed and level to which saturant gas can be incorporated into the molten polymer residing in the screw plasticizer is dependent upon the temperature and pressure on the system and will increase as these variables increase. The channel depths in the metering and restriction ring sections of the screw are chosen to permit saturant gas to be added to the molten polymer at a pressure level sufficient to facilitate its incorporation into the molten polymer. In most cases, it has been determined that introduction of the saturant gas at a pressure level ranging from 500–1000 psi higher than the pressure of the molten stream leaving the screw of the plasticizer yields the desired results.

B. 28:1 length-to-diameter screw:
1. First feed section length of 4 turns
2. Transition section length of 5 turns
3. First meter section length of 4 turns
4. Ring restriction length of ½ turn
5. Second feed section length of 3 turns
6. Second transition length of 4 turns
7. Second meter section length of 4 turns
8. Mixing section length equivalent to 3½ screw turns.

The screw channel depth profiles are selected to yield the same performance and end results noted above for the 24:1 length to diameter screw.

A brief description of a general procedure for effecting the mold preform fabrication will now be described.

Initially, a two stage screw plasticizer of the type available from commercial sources is selected. Each stage of the screw plasticizer includes a feed section, a transition section, and a metering section. Initially, pellets of a selected thermoplastic material are introduced into the hopper of the plasticizer. Following, the polymer is conveyed to the feed section of the first stage of the screw which has a constant root diameter, wherein the pellets are heated to a temperature usually less than that required for complete melting of the polymer, and where the pellets undergo partial melting as they are conveyed forward in the screw.

Then, the partially melted pellets travel to the transition section of the first stage, which has an increasing root diameter. In this section, the partially melted pellets are sheared and mechanically worked, and all melting thereof is effected. During travel through the transition section, all voids in the screw channel of the plasticizer are eliminated by the time the molten polymer reaches the downstream end of this section. Next, the molten polymer advances to the metering section of the first stage of the screw, which has a constant root diameter, which acts as a volumetric pump. Every turn of the screw in this section delivers a certain amount of melted polymer. It should be noted that up to this point the procedure is identical with well known prior art techniques.

Then, the molten polymer enters the feed section of the second stage of the screw, which has a constant root diameter, wherein the volumetric conveying rate is significantly larger, so resulting in a void section and partially filled flights. It is this phenomenon which serves as a departure point from the prior art in making preforms in that it permits the addition of a gas or a liquid. Thus, it is in this feed section of the second stage into which a saturant gas is added in an amount sufficient to saturate unfilled sites in the polymer or, if desired, to reach the desired level of supersaturation. This is effected by calculating the ratio of cubic centimeters of gas to cubic centimeters of polymer required to establish the desired level of saturation, and then adding saturant gas in this ratio to the polymer as it passes through the feed section of the second stage of the screw.

Next, the saturant gas starts to dissolve in the molten polymer as it advances to the transition section of the second stage of the screw which has an increasing root diameter. The increasing root diameter results in a reduction of the volumetric cross-section of the screw channel. At the downstream end of the transition section, the screw channels are completely filled with saturated or supersaturated molten polymer.

In the next step of the process, the molten polymer advances to the metering section of the second stage of the screw which has a constant root diameter. The molten polymer then leaves the metering section and may pass through a mixing section, after which it is shot into cooled molds for final cooling and solidification so resulting in the formation of a pre-saturated or supersaturated preform suitable for subsequent molding into a desired container.

The preforms so obtained may then be used as feedstock, in conventional stretch blow molding machines to yield a desired biaxially oriented container. In another typical process for the preparation of such containers, a so-called in-line stretch blow molding apparatus is employed, with all steps being performed therein. A typical processing sequence involves injection molding preforms (obtained in the above-described manner) and cooling them to within orientation temperature at the injection molding station located at the 3 o'clock position in the apparatus. After cooling, the preform mold opens and the preforms rotate counterclockwise on a preform carrier to a preform temperature conditioning station located at the 12 o'clock position in the stretch-blow molding machine. The temperature profile of the preforms is optimized with the use of heaters mounted within the conditioning station before being indexed counterclockwise to the next station. After temperature conditioning, the preforms are rotated counterclockwise on the carriers to the stretch blow molding station located at the 9 o'clock position in the machine. At this station, the temperature conditioned preforms are stretch-blow molded into biaxially oriented bottles inside cooled blow molds at this station. After cooling, the bottle molds are opened and the cooled biaxially oriented bottles are indexed counterclockwise to the final bottle ejection station where they are discharged from the stretch-blow molding machine.

In order to evaluate the efficacy of the preform fabrication technique described herein product shelf-life tests were conducted on carbonated soft drinks packaged in conventional 24 gram biaxially oriented half liter PET bottles, and bottles of the same size and weight which had been presaturated with carbon dioxide, or dichlorodifluoromethane (Freon 12) saturant gas. The beverages were initially carbonated to a level of 4.15 volumes of carbon dioxide before being introduced into the bottle and sealed. The test bottles containing the packaged product were then stored at room temperature and subsequently tested for carbonation retention after storage at various time intervals. The shelf life for the conventional bottles averaged about 7 weeks, at which time the bottles which had been presaturated with carbon dioxide had lost about $7\frac{1}{4}\%$ of their original carbonation. Bottles presaturated with Freon 12 (dichlorodifluoromethane) were found to have lost about $5\frac{1}{2}\%$ of their original carbonation over the same time frame. Extrapolation of the test data on presaturated bottles prepared in accordance with the present invention results in shelf-life expectations of $15\frac{1}{2}$ and 21 weeks, for bottles presaturated with carbon dioxide and freon 12, respectively. It should be noted that these results correspond to shelf life extensions of $8\frac{1}{2}$ and 14 weeks, respectively, both of which are greater than the $3\frac{1}{2}$ week extension expected if the sorption loss, alone, was eliminated. The extra extensions realized in these studies are attributed to the fact that the bottles were actually supersaturated before testing.

The foregoing results confirm that attractive shelf-life extensions can be attained if carbonated soft drinks are packaged in presaturated thermoplastic containers and especially when the container walls are supersaturated with selected saturant gases such as carbon dioxide and dichlorodifluoromethane.

We claim:

1. Presaturated plastic preform saturated with a dissolved presaturant gas selected from the group consisting of carbon dioxide, dichlorodifluoromethane, and oxygen.

2. Preform in accordance with claim 1 comprising polyethylene terephthalate.

3. Preform in accordance with claim 2 wherein said gas is carbon dioxide.

4. Preform in accordance with claim 2 wherein said gas is dichlorodifluoromethane.

5. Preform in accordance with claim 1 wherein said gas is dichlorodifluoromethane.

6. Preform in accordance with claim 1 wherein the preform is supersaturated with said gas.

* * * * *